United States Patent
Liao et al.

(10) Patent No.: US 7,350,219 B2
(45) Date of Patent: Mar. 25, 2008

(54) SLOT-IN OPTICAL RECORDING AND/OR REPRODUCTION APPARATUS

(75) Inventors: Chung-Ta Liao, Hsinchu (TW); Jui-Chiang Lin, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 384 days.

(21) Appl. No.: 11/012,142

(22) Filed: Dec. 16, 2004

(65) Prior Publication Data

US 2005/0138652 A1  Jun. 23, 2005

(30) Foreign Application Priority Data

Dec. 17, 2003 (TW) .............................. 92222122 U

(51) Int. Cl.
*G11B 33/02* (2006.01)
(52) U.S. Cl. .................................................... 720/647
(58) Field of Classification Search .................. None
See application file for complete search history.

(56) References Cited

U.S. PATENT DOCUMENTS

| | | | | |
|---|---|---|---|---|
| 5,084,855 A | * | 1/1992 | Kobayashi et al. | 720/647 |
| 5,408,459 A | * | 4/1995 | Kawaguchi et al. | 720/647 |
| 5,537,378 A | * | 7/1996 | Uehara et al. | 369/30.75 |
| 5,870,368 A | * | 2/1999 | Nakamichi | 720/645 |
| 5,940,245 A | * | 8/1999 | Sasaki et al. | 360/99.06 |
| 6,404,720 B1 | * | 6/2002 | Inoue | 720/647 |
| 2004/0004785 A1 | * | 1/2004 | Seo | 360/97.01 |

* cited by examiner

*Primary Examiner*—William Korzuch
*Assistant Examiner*—Mark Blouin
(74) *Attorney, Agent, or Firm*—Ming Chow; Sinorica, LLC

(57) ABSTRACT

A slot-in optical recording and/or reproducing apparatus includes a case formed with a slot and a swingable cover. The case provides a housing for adopting components of the slot-in optical recording and/or reproducing apparatus. The optical disk is drawn out of/into the slot-in optical recording and/or reproducing apparatus through the slot. The swingable cover is used to expose/block the slot to/from the exterior of the slot-in optical recording and/or reproducing apparatus.

6 Claims, 5 Drawing Sheets

SLOT-IN OPTICAL RECORDING AND/OR REPRODUCTION APPARATUS

BACKGROUND OF THE INVENTION (1) Field of the Invention

The disclosure relates to an optical recording and/or reproducing apparatus, and more particularly to an optical recording and/or reproducing apparatus of slot-in type with an openable blocking-cover.

(2) Description of the Prior Art

As various applications in multi-media technology widely spread, the demand for the large-volume data storage media, such as Compact Disk, and the access device, such as Compact Disk Drive, have been growing rapidly. In particular, the application using CD as a storage media has remarkable increased, so the optical read/write device, which is used to read/write the CD, is also extremely popular. Nowadays, for example, each Personal Computer at least has one optical access (read/write) device, such as CD-ROM, CD-RW, Slot-In Optical read/write device, Combo CD drive, DVD-R/RW drive, . . . and external CD drive.

In order to easily and quickly draw/insert the CD from/to the CD drive, as well as to the request for slim, thin, and light product design, the slot-in is a very attractive option for the CD drive design. So this type of design (slot-in type) is generally adopted in car stereo system and note book computer as an optical read/write device to read and/or write CD.

Because the optical recording and/or reproducing apparatus is used to optically read/write a compact disk (or optical disk), so the optical recording and/or reproducing apparatus is also referred as optical read/write drive hereafter. FIG. 1 schematically shows a perspective view of the front portion of the traditional slot-in optical read/write drive 2 and a Compact Disk 4 fed thereto. Sparing the ejectable tray for loading CD, the slot-loading design prevails the tray-loading design in many applications in optical read/write driver. However, without the protection provided by the cover at the front edge of the slot 6, exterior dust and small object will easily intrude through slot 6 of the traditional slot-in optical read/write drive 2, in addition, the noise from the operation of the internal device of the traditional slot-in optical read/write drive 2 will directly spread to exterior through the slot 6.

Due to the foregoing reason, the exterior material tends to pass slot 6, and accumulate on the interior device or mechanism of the traditional slot-in optical read/write drive 2, then malfunction resulted and the expected life of the traditional slot-in optical read/write drive 2 can not be reached. Even if the traditional slot-in optical read/write drive 2 can work properly, the noise from the traditional slot-in optical read/write drive 2 resulted from normally operating parts and intruding-material accumulated parts probably will make the user doubts the quality of the traditional slot-in optical read/write drive 2. This noisy operation will greatly deduct the value of the traditional slot-in optical read/write drive 2.

Because of the problems mentioned above, this disclosure provide an apparatus to solve the problems and to improve the value of the traditional slot-in optical read/write drive 2.

SUMMARY OF THE INVENTION

Accordingly, it is one object of the present invention to provide a optical read/write drive with a swingable cover to avert external dust and small object from intruding into the read/write device and to prevent the interior-generated noise from spreading out of the optical read/write drive. So the life of the optical read/write drive can be prolonged, and the value of this product can be raised.

It is another object of the present invention to provide a fitting pad adherent to the inward surface of the swingable cover, which is to be squeezed into the slot, so the edges of the slot can seize the fitting pad, and further improve the dust-proof, intruding-object-proof and sound-proof efficiency.

It is one more object of the present invention to provide a handy device, which is an impetus part, protruding outwardly from the outward surface of the swingable cover, thus the user can swing the swingable cover to expose/block the slot more easily when the user wants to access the CD.

In one aspect of the present invention, the present invention relates to a slot-in read/write drive includes a case having a slot, a swingable cover, a fitting pad and a impetus part, the user can access compact disk through the slot from the slot-in read/write drive.

The fitting pad mentioned above, which is adherent to the inward surface of the swingable cover, is also designed to be squeezed into the slot at the time when the swingable cover blocking the slot. In addition. the present invention further includes two pivots and two bearings. The two pivots are formed on the two ends of the longitudinal side of the swingable cover respectively, and the two bearings are positioned on the case and adjacent to the two ends of the edge of the slot respectively. The two pivots are engaged to the two bearings respectively, thereby axially jointing the swingable cover to the case adjacent to the edge of the slot.

The impetus part is also designed for being applied with a force thereon, thus enabling the swingable cover to swing in a predetermined direction. The impetus part protrudes from the outward surface of the swingable cover, thereby the impetus part itself provides a predetermined distance from the exterior surface of the slot-in optical read/write drive when the slot is blocked by the swingable cover.

The foregoing description detailed how the present invention utilizes a swingable cover of the optical read/write drive to avert external dust and small object from intruding into the read/write device and to prevent the interior-generated noise from spreading out of the optical read/write drive. This is the reason why the life of the optical read/write drive can be prolonged, and the value of this product can be raised. According to the present invention, the fitting pad is adherent to the inward surface of the swingable cover, which is to be squeezed into the slot, so the edges of the slot can seize the fitting pad, and further improve the dust-proof, intruding-object-proof and sound-proof efficiency. The present invention also provides a handy device, which is an impetus part, protruding outwardly from the outward surface of the swingable cover, thus the user can swing the swingable cover to expose/block the slot more easily when the user wants to access the CD.

BRIEF DESCRIPTION OF THE DRAWINGS

The present invention will now be specified with reference to its preferred embodiment illustrated in the drawings, in which FIG. 1 schematically shows a perspective view of the front portion of the traditional slot-in optical read/write drive and a compact disk (CD) fed thereto.

DESCRIPTION OF THE PREFERRED EMBODIMENT

Figure 1:
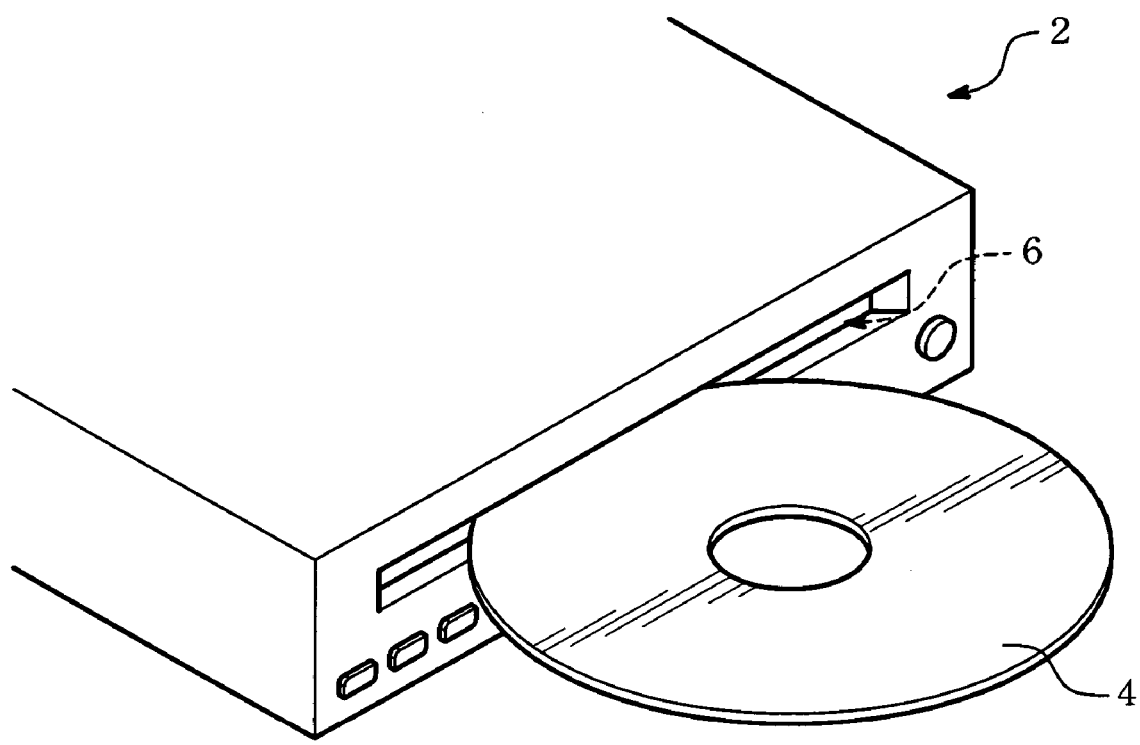
Figure 2A:
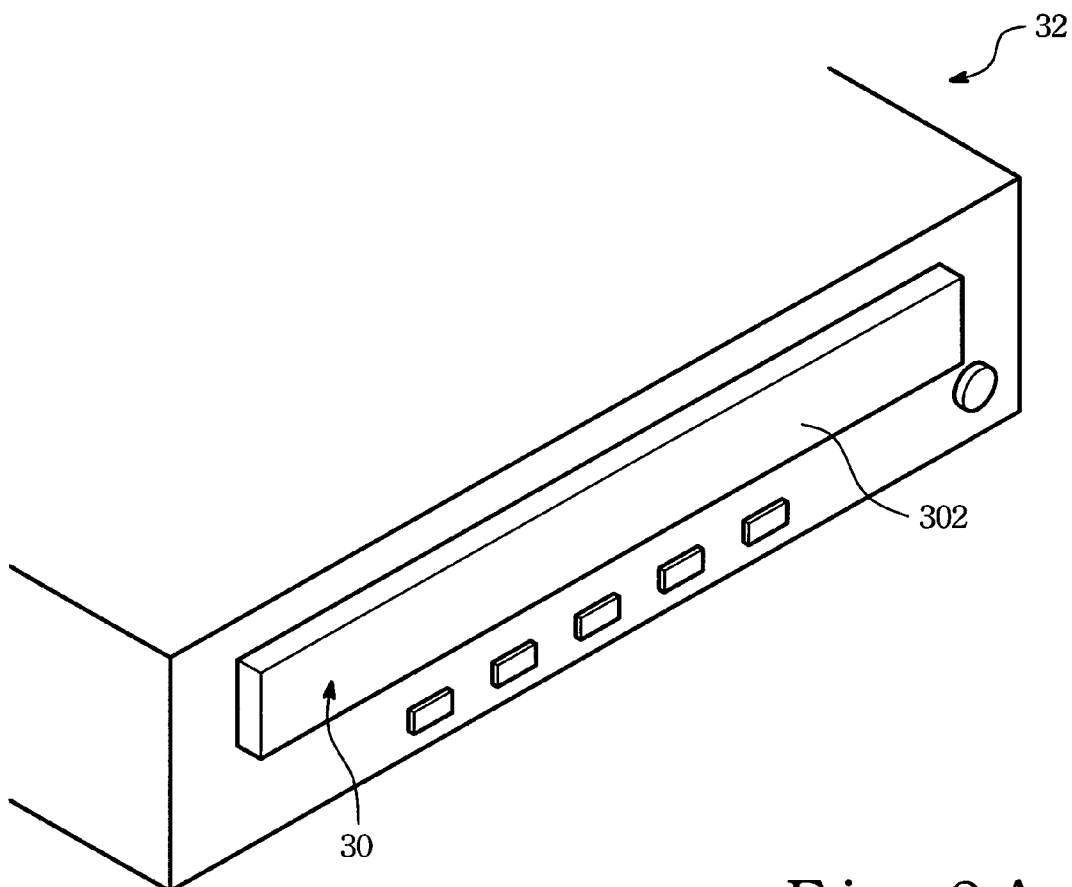
FIG. 2A schematically illustrates the perspective view of the openable blocking cover and the optical read/write drive in accordance with the first preferred embodiment of the present invention.
Figure 2B:
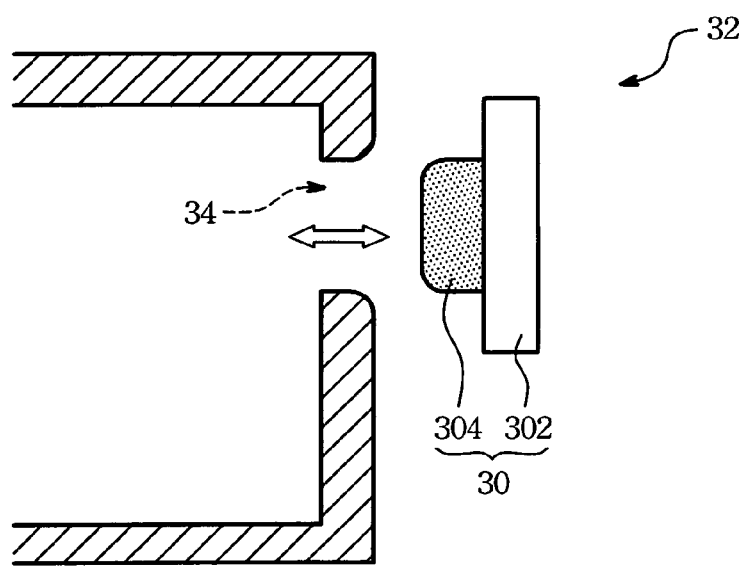
FIG. 2B illustrates the cross-sectional side view of the front portion of the optical read/write drive and the openable blocking cover and the spacial relationship between them.

FIG. 2A schematically illustrates the perspective view of the openable blocking cover 30 and the optical read/write drive 32 in accordance with the first preferred embodiment of the present invention. FIG. 2B illustrates the cross-sectional side view of the front portion of the optical read/write drive 32 and the openable blocking cover 30 and the spacial relationship between them. This invention discloses an optical read/write drive 32 comprising a case 31 have a slot 34 formed thereupon wherein an optical disk is drawn out of/into the slot-in optical read/write apparatus 32 through the slot 34 and an openable blocking cover 30, which can be utilized to cover the slot 34 and to isolate the interior of the optical read/write drive 32 from the exterior.

According to the first preferred embodiment of the present invention, the openable blocking cover 30 includes a swingable cover 302 and a fitting pad 304, wherein the fitting pad 304 can be a soft pad. When the slot 34 is covered by the openable blocking cover 30, the fitting pad 304 is tightly inserted in the slot 34 so that the dust and exterior object has been prevented from entering the optical read/write drive 32 via the slot 34 and the internal operation noise has been isolated from scattering out of the optical read/write drive 32 via the slot 34.

Figure 3:
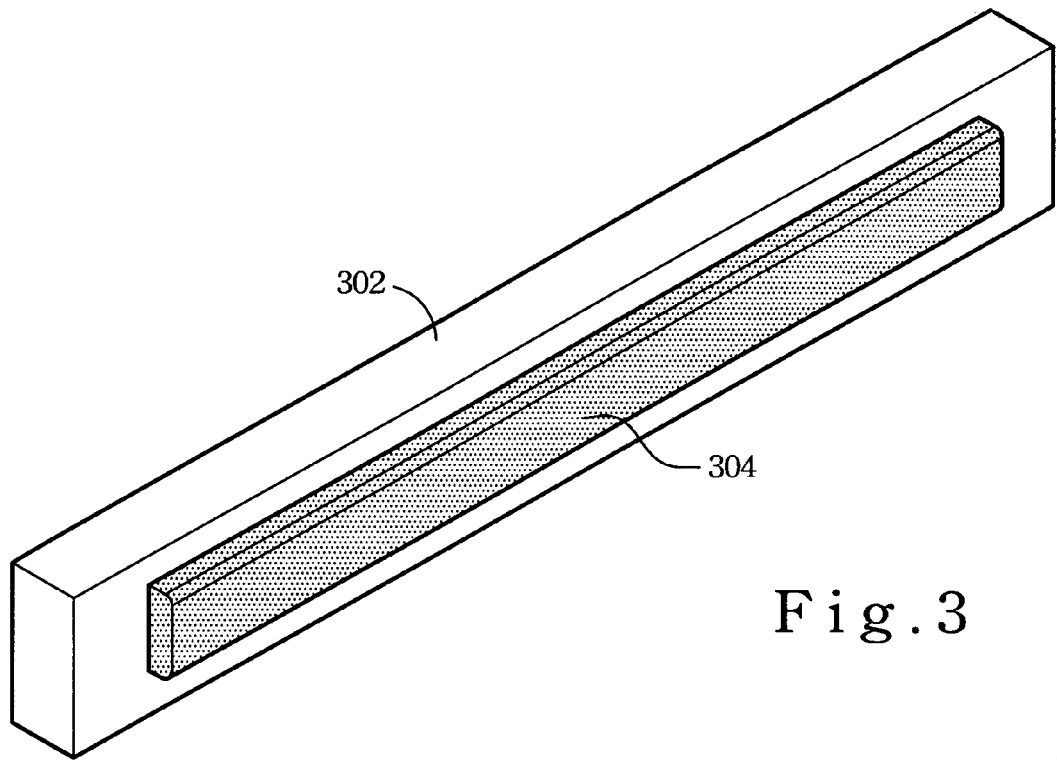
FIG. 3 is the schematic perspective view of the openable blocking cover from inward surface.

The schematic side view of the openable blocking cover 30 is shown in FIG. 2B, and the schematic perspective view of the openable blocking cover 30 from inward surface is shown in FIG. 3. According to the first preferred embodiment of the present invention, the swingable cover 302 is used to expose/block the slot 34, wherein the fitting pad 304 is adherent to the swingable cover 302, and is positioned between the swingable cover 302 and the slot 34. When blocking the slot 34, please referring to FIG. 2B, the swingable cover 302 forces the fitting pad 304 to insert in the slot 34. As shown in FIG. 3, the size of the fitting pad 304 make itself lodge in as well as block the slot 34, thus the interior of optical read/write drive 32 has been sealed to improve the dust-proof, intruding-object-proof, and sound-proof efficiency; Being fitted to the slot 34, the fitting pad 304 makes the swingable cover 302 keep close even when an unexpected external force applied thereon. As depicted in the first preferred embodiment of the present invention, the material of the fitting pad can be made of rubber, soft material (such as soft plastic or foamed plastic) or elastic material.

Figure 4A:
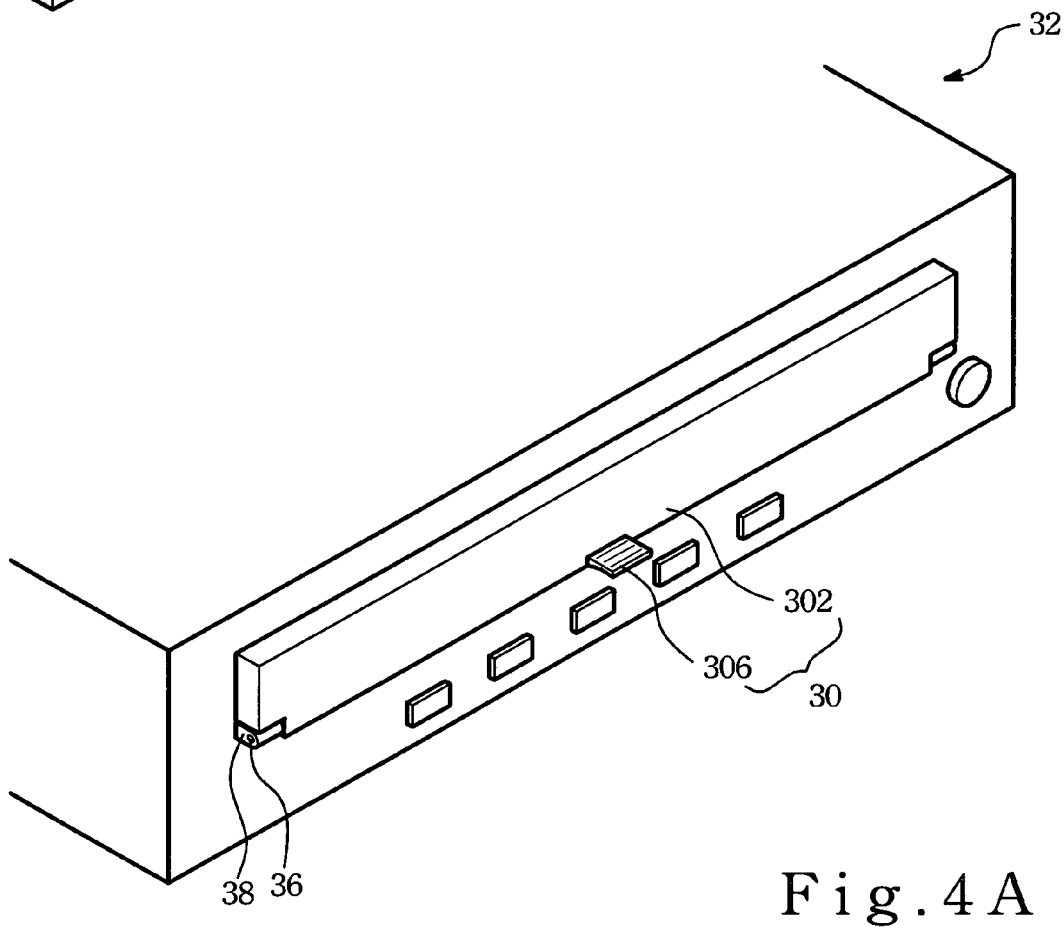
FIG. 4A schematically illustrates the perspective view of the openable blocking cover and the optical read/write drive in accordance with the second preferred embodiment of the present invention.
Figure 4B:
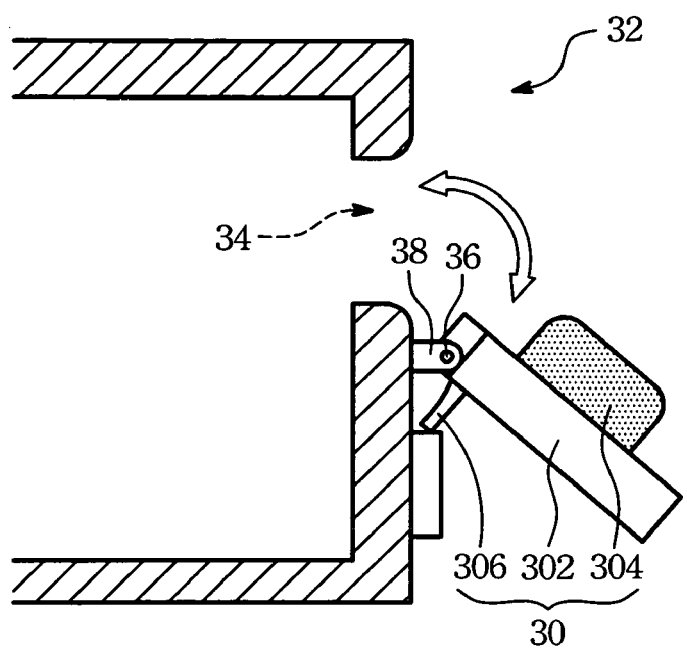
FIG. 4B illustrates the cross-sectional side view of the front portion of the optical read/write drive and the openable blocking cover, and the spacial relationship between them.

FIG. 4A schematically illustrates the perspective view of the openable blocking cover 30 and the optical read/write drive 32 in accordance with the second preferred embodiment of the present invention. FIG. 4B illustrates the cross-sectional side view of the front portion of the optical read/write drive 32 and the openable blocking cover 30 and the spacial relationship between them. According to the second embodiment of the present disclosure, the an optical read/write drive 32 comprising a case 31 have a slot 34 formed thereupon wherein an optical disk is drawn from/into the slot-in optical read/write apparatus 32 through the slot 34 and an openable blocking cover 30, which can be utilized to block the slot 34 and to isolate the interior of the optical read/write drive 32 from the exterior. In addition, the openable blocking cover 30 includes a swingable cover 302, a fitting pad 304, and a impetus part 306, wherein the fitting pad 304 can be a soft pad. When the slot 34 is covered by the openable blocking cover 30, the fitting pad 304 is tightly inserted in the slot 34 so that the dust and exterior object has been prevented from entering the optical read/write drive 32 via the slot 34 and the internal operation noise has been isolated from scattering out of the optical read/write drive 32 via the slot 34.

One longitudinal side of the swingable cover 302 is axially jointed on the case 31 and adjacent to one edge of the enclosure surrounding the slot 34, i.e., is axially jointed to one edge of the slot 34. As obviously depicted in FIG. 4B, the other longitudinal side of the swingable cover 302 can swing, thus enabling the swingable cover 302 to pivot on the axis parallel to the longitudinal side of the swingable cover 302, which is jointed to the foregoing edge of the slot 34, and the swingable cover 302 can expose/block the slot 34 thereby. In the second preferred embodiment of the present disclosure, please referring back to FIG. 4A, there are two pivots 36 located on two ends of the foregoing longitudinal side of the swingable cover 302 respectively. Each pivot 36 correspondingly engages one of the two bearings 38, which are respectively positioned on two ends of the foregoing edge of the enclosure surrounding the slot 34. Thus the swingable cover 302 can pivot on the direction parallel to the foregoing edge of the slot 34.

According to the second embodiment of the present disclosure, the schematic side view of the openable blocking cover 30 is shown in FIG. 4B, and the schematic perspective view of the openable blocking cover 30 is shown in FIG. 3. According to the second embodiment of the present invention, the swingable cover 302 is used to expose/block the slot 34, wherein the fitting pad 304 is adherent to the swingable cover 302, and is positioned between the swingable cover 302 and the slot 34. When blocking the slot 34, please referring to FIG. 4B, the swingable cover 302 forces the fitting pad 304 to cover and block the slot 34. In addition, the size of the fitting pad 304 make itself lodge in as well as block the slot 34, thus the interior of optical read/write drive 32 has been sealed to improve the dust-proof, intruding-object-proof and sound-proof efficiency. Being fitted to the slot 34, the fitting pad 304 makes the swingable cover 302 keep close even when an unexpected external force applied thereon. As depicted in the second preferred embodiment of the present disclosure, the material of the fitting pad can be made of rubber, soft material (such as soft plastic or foamed plastic) or elastic material.

Please refer to FIG. 4B, the impetus part 306 is protruded and positioned at outward surface of the swingable cover 302, which is adjacent to simultaneously perpendicular to the surface facing the slot 34. In other words, the impetus part 306 is located at the outward surface of the swingable cover 302 from the slot 34. The swingable cover 302 can swing in an expected direction responding to a force applied on the impetus part 306, and the slot 36 is opened/closed.

Figure 5:
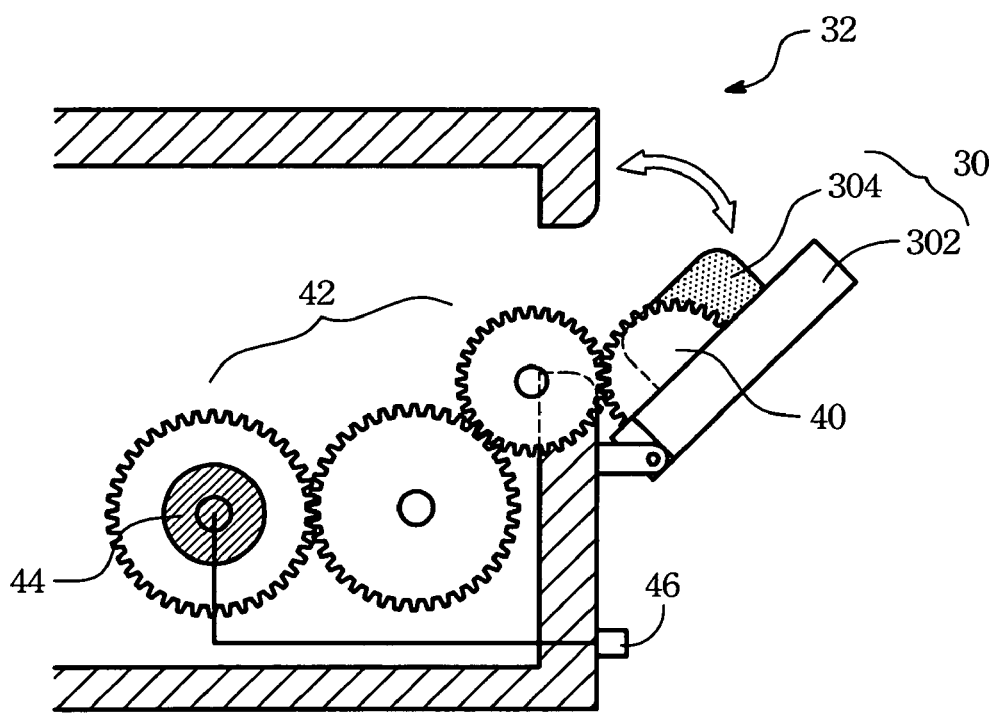
FIG. 5 schematically illustrates, in side view, the cross section of the front portion of the optional read/write drive according to the third embodiment of the present invention, which utilizes a certain mechanism (e.g., a gear drive) to enable the swingable cover to swing without manual force.

Because it is manually operated, the type of impetus part 306 mentioned above can be utilized in the swingable cover 302 referred as a manual type. In addition, in the third embodiment of the present invention, the swingable cover 302 can automatically swing to expose/block the slot 34 without manual force. To roughly illustrate the construction, please refer to FIG. 5, in side view, it schematically illustrates the cross section of the front portion of the optional read/write drive 32 including the openable blocking cover 30, which utilizes a certain mechanism such as a gear drive to enable the swingable cover 302 to swing without manual force. Because the mechanism operates responds to an electric signal, and is driven by electricity, this type of swingable cover 302 can be referred as electricity driven type. The gear drive mentioned above, according to the third embodiment of the present invention, includes a fixed gear wheel 40 being a semicircle gear wheel in this embodiment fixed on the inward surface of the swingable cover 302, a gear wheel unit 42 and a driving device 44 electrically coupled to a button 46. The gear wheel 40 is engaged to the gear wheel unit 42, and the gear wheel unit 42 is driven by driving device 44 such as a motor which is driven by the power from electricity. The driving device 44 is activated by a control signal (for example an electric signal) generated responding to pushing the button 46 on the outward surface of the optional read/write drive 32. Thus, by pushing the button 46, the user can easily control the swinging of the swingable cover 302, thereby exposing/blocking the slot 34 easily.

Figure 6:
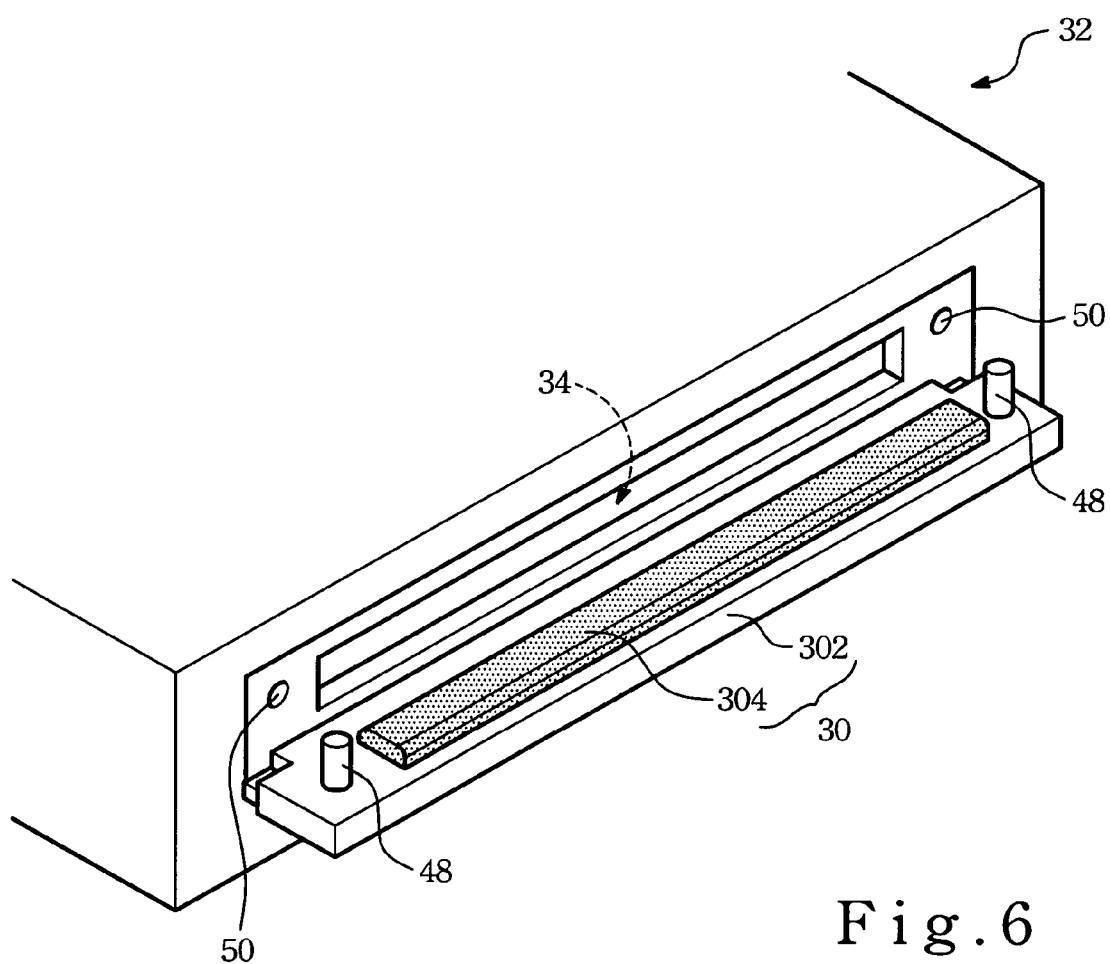
FIG. 6 schematically shows the fourth embodiment of the present invention.

In order to more firmly fix the swingable cover 302 in position while the swingable cover 302 blocking the slot 34, in the fourth embodiment of the present invention, please refer to FIG. 6, the swingable cover 302 and the edge of the slot 34 respectively include the positioning post 48 and positioning hole 50 formed thereon. This construction can also be applied to all other aspects of all embodiments of the present invention. The two positioning posts 48 are adherent to the inward surface of the swingable cover 302, and are longitudinally separated by the fitting pad 304, accordingly, the two positioning holes 50 are formed in the front of the case 31 of the optional read/write drive 32 and positioned corresponding to the two positioning posts 48 respectively, thus enabling the two positioning posts 48 inserting into the two positioning holes 50 when the swingable cover 302 blocking the slot 34. Solo squeezing the fitting pad 304 into the slot 34 sometimes can not provide enough force to hold the swingable cover 302, so the fourth embodiment of the present invention use the positioning post 48 and the positioning hole 58 to provide additional force to prevent the swingable cover 302 from unexpected opening and to keep the swingable cover 302 in position.

According to the foregoing description, the swingable cover 302 of the optical read/write drive 32 in the present invention can avoid dust and small object invasion from the exterior, and prevent the interior-generated noise from spreading out of the optical read/write drive 32. So the life of the optical read/write drive 32 according to the present invention can be prolonged, and the value of this product can be raised. In addition, the fitting pad 304 adherent to the inward surface of the swingable cover 302 is to be squeezed into the slot 34, so the present invention can further improve dust-proof, intruding-object-proof and sound-proof efficiency. Furthermore, in order to make the optical read/write drive 32 a handy device, a impetus part 306 is added to the outward surface of the swingable cover 302, thus the user can open the swingable cover 302 to expose the slot 34 more easily when the user wants to access the CD.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

We claim:

1. A slot-in optical read/write apparatus comprising:
    a case having a slot formed thereupon, wherein an optical disk is drawn out of/into said slot-in optical read/write apparatus through said slot; and
    a swingable cover for exposing/blocking said slot to/from exterior of said slot-in optical read/write apparatus, wherein one longitudinal side of said swingable cover is axially jointed on said case; and
    a fitting pad adhered to an inward surface of said swingable cover for being inserted into said slot at the time when said swingable cover blocks said slot;
    two positioning posts, inwardly protruding from inward surface of said swingable cover being separated by said fitting pad; and
    two positioning holes, positioned on said case to adopt said two positioning posts respectively when said swingable cover blocks said slot.

2. The slot-in optical read/write apparatus of claim 1, further comprising an impetus part for being applied a force thereon, which enables said swingable cover to swing in a predetermined direction, said impetus part being protruded and positioned at an outward surface of said swingable cover from said slot.

3. The slot-in optical read/write apparatus of claim 1, further comprising a semicircle-gear-wheel and a gear wheel unit respectively fixed to said swingable cover and disposed in said case, said gear wheel unit being rotated by a driving device and being engaged to said semicircle-gear-wheel for swinging said swingable cover.

4. The slot-in optical read/write apparatus of claim 1, further comprising two pivots and two bearings, said two pivots being formed on two ends of said longitudinal side of said swingable cover, said two bearings being positioned on said case and adjacent to two ends of said edge of said slot, said two pivots are engaged with said two bearings respectively, thereby axially jointing said swingable cover to said case.

5. The slot-in optical read/write apparatus of claim 1, wherein said fitting pad is formed of rubber.

6. The slot-in optical read/write apparatus of claim 1, wherein said fitting pad is formed of soft plastic.

* * * * *